United States Patent
Carufel

(10) Patent No.: US 11,907,335 B2
(45) Date of Patent: Feb. 20, 2024

(54) SYSTEM AND METHOD FOR FACILITATING AUTONOMOUS TARGET SELECTION

(71) Applicant: Cognitive Space, Manvel, TX (US)

(72) Inventor: Guy de Carufel, Manvel, TX (US)

(73) Assignee: Cognitive Space, Manvel, TX (US)

( * ) Notice: Subject to any disclaimer, the term of this patent is extended or adjusted under 35 U.S.C. 154(b) by 353 days.

(21) Appl. No.: 17/503,417

(22) Filed: Oct. 18, 2021

(65) Prior Publication Data

US 2022/0121882 A1 Apr. 21, 2022

Related U.S. Application Data

(60) Provisional application No. 63/092,700, filed on Oct. 16, 2020.

(51) Int. Cl.
*G06F 18/21* (2023.01)
*G06N 3/047* (2023.01)

(52) U.S. Cl.
CPC ........... *G06F 18/217* (2023.01); *G06N 3/047* (2023.01)

(58) Field of Classification Search
None
See application file for complete search history.

(56) References Cited

U.S. PATENT DOCUMENTS

| | | | |
|---|---|---|---|
| 10,628,733 B2 | 4/2020 | Schaul et al. | |
| 10,762,424 B2 | 9/2020 | Nazari et al. | |
| 2020/0143239 A1 | 5/2020 | Simonyan et al. | |

FOREIGN PATENT DOCUMENTS

| | | | | |
|---|---|---|---|---|
| CN | 109625333 A | * | 4/2019 | ............... B64G 1/24 |
| CN | 109325911 B | * | 4/2020 | ........... G06T 3/4038 |
| CN | 111859541 A | * | 10/2020 | ........... G05D 1/0088 |
| CN | 111880563 A | * | 11/2020 | ............. G05D 1/104 |
| CN | 111897316 A | * | 11/2020 | ........... G05D 1/0088 |
| CN | 112766497 A | | 5/2021 | |
| GB | 2589351 A | | 6/2021 | |
| JP | 2022541505 A | * | 7/2020 | |

* cited by examiner

*Primary Examiner* — Fan Zhang
(74) *Attorney, Agent, or Firm* — Jason C. Cameron

(57) ABSTRACT

A system and method for facilitating autonomous target selection through neural networks is disclosed. The method includes receiving a request from a user to select a target from one or more targets for an agent to perform one or more activities and receiving one or more input parameters. The method further includes generating an expected reward value for each of the one or more targets and determining a desired target among the one or more targets based on the generated expected reward or empirical estimation. Further, the method includes generating one or more actions to be executed by the agent corresponding to the desired by using a trained policy network based ANN model and outputting the determined one or more actions to at least one of: the agent and one or more user devices associated with the user for performing the one or more activities.

20 Claims, 7 Drawing Sheets

SYSTEM AND METHOD FOR FACILITATING AUTONOMOUS TARGET SELECTION

EARLIEST PRIORITY DATE

This application claims priority from a Provisional patent application filed in the United States of America having Patent Application No. 63/092,700, filed on Oct. 16, 2020, and titled "SYSTEM AND METHOD FOR TARGET SELECTION THROUGH NEURAL NETWORKS".

FIELD OF INVENTION

Embodiments of the present disclosure relate to autonomous target selection and more particularly relates to a system and a method for facilitating autonomous target selection through neural networks to perform one or more activities.

BACKGROUND

A target refers to an object or point of attention for a desired effect. Alternately, a target is an area of interest for observation. Therefore, selecting a correct target for an agent, such as space craft, land craft, watercraft and the like is a crucial process. Target evaluation is an extremely important part while making recommendations regarding which target should be selected to fulfil the agent's objectives.

Traditionally available systems use non-machine learning approaches for target selection such as the target selection using a human operator, or use of a heuristic approach, a control theory approach, and the like, which increases the amount of human intervention and makes the system time-consuming. As an example, human operation is time-consuming and thus not optimal. Meanwhile, heuristic methods are inflexible and miss correlations to improve performance that a machine learning agent can find more readily without explicitly being told.

Hence, there is a need for a system and method for facilitating autonomous target selection through neural networks in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating autonomous target selection through neural networks is disclosed. The computing system includes one or more hardware processors and a memory unit coupled to the one or more hardware processors. The memory includes a plurality of modules in the form of programmable instructions executable by the one or more hardware processors. The plurality of modules includes a data receiver module configured to receive a request from a user to select a target from one or more targets for an agent to perform one or more activities. The request includes type of the agent, one or more targets to be observed, types of the one or more targets, time to perform the one or more activities, priority of the one or more targets and recurring requirement of performing the one or more activities. The agent is one of: a space craft, land craft and water craft. The one or more targets include: one or more ground targets, one or more space targets, one or more air targets, one or more space targets and one or more water targets. The one or more activities include: capturing one or more images of the one or more targets, collecting observation data of the one or more targets, and interacting with the one or more targets. The data receiver module is also configured to receive one or more input parameters from at least one of: the user and one or more external sources based on the received request. The plurality of modules also includes a data management module configured to generate an expected reward value for each of the one or more targets by applying the received request and the one or more input parameters to a trained value network based Artificial Neural Network (ANN) model. The data management module is also configured to determine a desired target among the one or more targets based on the generated expected reward value of each of the one or more targets by using one of: the trained value network based ANN model and empirical estimation. The desired target corresponds to a higher expected reward value. Further, the data management module is configured to generate one or more actions to be executed by the agent corresponding to the desired target based on the received request, the received one or more input parameters, the desired target, one or more dynamic parameters and the expected reward value by using a trained policy network based ANN model. The one or more actions include: slew the agent towards the desired target, slew to a default state, take no action, keep custody of the desired target and consider the next desired target. The one or more dynamic parameters include: changing weather, changing environmental conditions, changing states of the agent and surrounding agents, changing states of the target and of other targets and total time left to execute the one or more actions. The plurality of modules further include a data output module configured to output the determined one or more actions to at least one of: the agent and one or more user devices associated with the user for performing the one or more activities.

In accordance with another embodiment of the present disclosure, a method for facilitating autonomous target selection through neural networks is disclosed. The method includes receiving a request from a user to select a target from one or more targets for an agent to perform one or more activities. The request includes type of the agent, one or more targets to be observed, types of the one or more targets, time to perform the one or more activities, priority of the one or more targets and recurring requirement of performing the one or more activities. The agent is one of: a space craft, land craft and watercraft. The one or more targets include: one or more ground targets, one or more space targets, one or more air targets and one or more water targets. The one or more activities include: capturing one or more images of one or more targets, collecting observation data of the one or more targets and interacting with the one or more targets. The method also receiving one or more input parameters from at least one of: the user and one or more external sources based on the received request. The method further includes generating an expected reward value for each of the one or more targets by applying the received request and the one or more input parameters to a trained value network based Artificial Neural Network (ANN) model. Further, the method includes determining a desired target among the one or more targets based on the generated expected reward value of each of the one or more targets by using one of: the trained value network based ANN model and empirical estimation. The expected reward value associated with the desired target corresponds to a higher expected reward value. Also, the method includes generating one or more actions to be executed by the agent corresponding to the desired target based on the received request, the received one or more input parameters, the desired target, one or more dynamic parameters and the expected reward value by using a trained policy network based ANN model. The one or more actions include: slew the agent towards the desired target, take no action, slew to a default state, keep custody of the desired target and change the desired target. The one or more dynamic parameters include: changing weather, changing environmental conditions, changing states of the agent and surrounding agents, changing states of the target and of other targets and total time left to execute the one or more actions. Furthermore, the method includes outputting the determined one or more actions to at least one of: the agent and one or more user devices associated with the user for performing the one or more activities.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
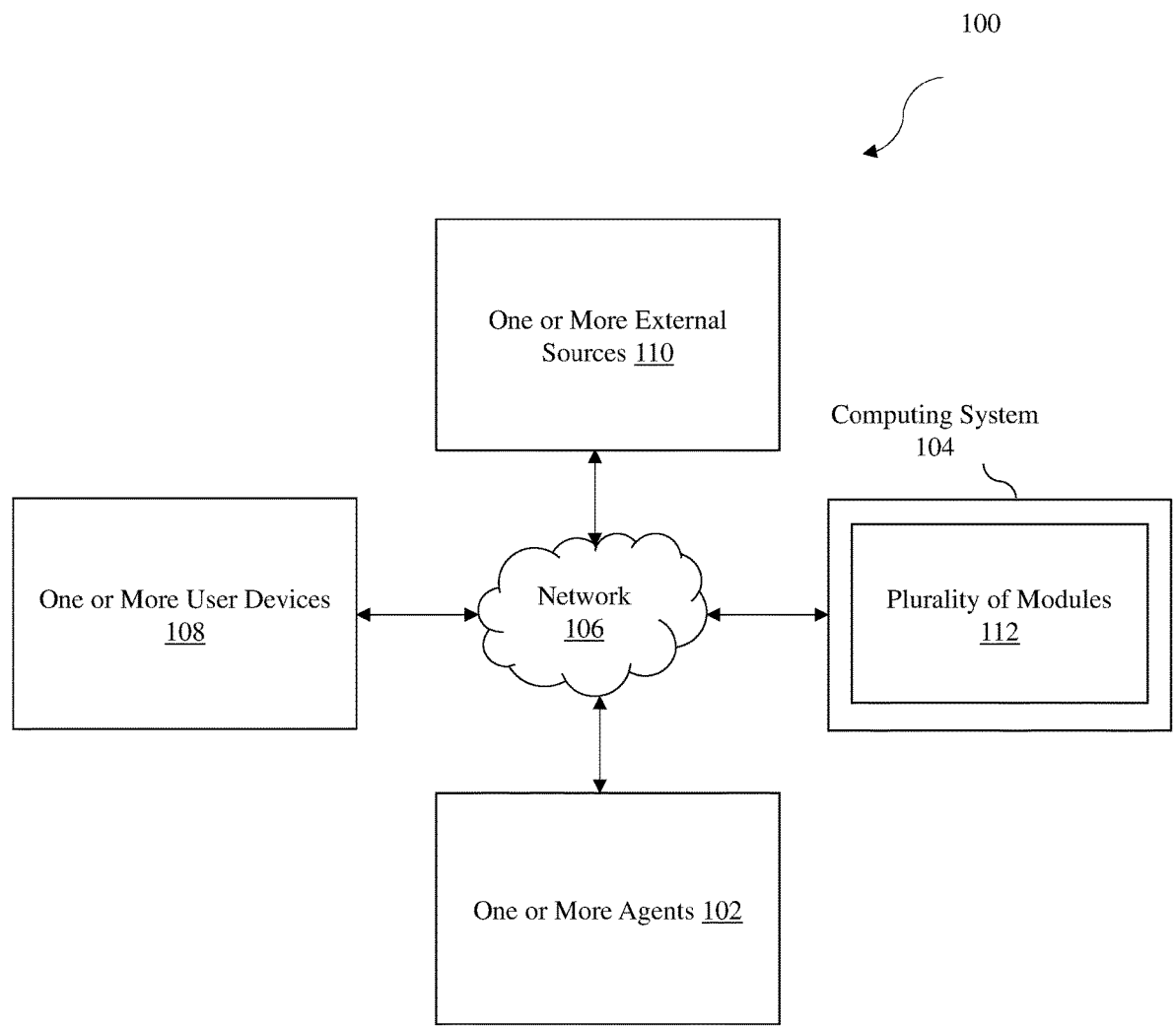
FIG. 1 is a block diagram illustrating an exemplary computing environment for facilitating autonomous target selection through neural networks, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Although the explanation is limited to a single agent. However, it should be understood by the person skilled in the art that the computing system is applied if there are more than one agent.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a block diagram illustrating an exemplary computing environment for facilitating autonomous target selection through neural networks, in accordance with an embodiment of the present disclosure. According to FIG. 1, the computing environment 100 includes one or more agents 102 communicatively coupled to a computing system 104 via a network 106. In an embodiment of the present disclosure, the one or more agents 102 are configured to perform one or more activities, such as capturing one or more images of one or more targets, collecting observation data of the one or more targets and interacting with the one or more targets. The one or more targets refer to objects, point of attention or interaction, an area of interest for observation and the like. In an exemplary embodiment of the present disclosure, the one or more targets include one or more ground targets, one or more space targets, one or more air targets and one or more water targets. Further, the one or more agents 102 include space crafts, land crafts, watercrafts and the like. In an exemplary embodiment of the present disclosure, the space craft may be a satellite. The present explanation is limited to a single agent. However, it should be understood by the person skilled in the art that the computing system 104 is applied if there are more than one agent. In an exemplary embodiment of the present disclosure, the network 106 may be the internet or any other wireless network. In an embodiment of the present disclosure, the computing system 104 may be hosted on a central server, such as cloud server or a remote server. In another embodiment of the present disclosure, the computing system 104 may be hosted on the agent. In yet another embodiment of the present disclosure, the computing system 104 may be partially hosted on the central server and partially hosted on the agent. For example, training of Artificial Neural Network (ANN) models may be performed on the central server and once the ANN models are trained, application of the trained ANN models to perform selection of one or more targets and one or more actions to be executed may be performed by the agent.

Further, the computing environment 100 includes one or more user devices 108 associated with a user communicatively coupled to the computing system 104 via the network 106. The user may be an agent operator, such as satellite operator. The one or more user devices 108 may be used by the user to generate a request for the computing system 104 to select a target from the one or more targets, such that an agent may perform the one or more activities corresponding to the selected target. The one or more user devices 108 may also be used by the user to receive one or more actions for performing the one or more activities. Furthermore, the user may also use the one or more user devices 108 to transmit one or more input parameters to the computing system 104. In an exemplary embodiment of the present disclosure, the one or more user devices 108 may include a laptop computer, desktop computer, tablet computer, smartphone, wearable device, smart watch and the like. Further, the computing environment 100 includes one or more external sources 110 configured to transmit the one or more input parameters to the computing system 104. In an exemplary embodiment of the present disclosure, the one or more external sources 110 may be weather department and the like. Details on the one or more input parameters have been elaborated in subsequent paragraphs of the present description with reference to FIG. 3.

Further, the one or more user devices 108 includes a local browser, a mobile application or a combination thereof. Furthermore, the user may use a web application via the local browser, the mobile application or a combination thereof to communicate with the computing system 104. The user may use the computing system 104 to receive one or more actions to be executed by the agent. The computing system 104 includes a plurality of modules 112. Details on the plurality of modules 112 have been elaborated in subsequent paragraphs of the present description with reference to FIG. 3.

In an embodiment of the present disclosure, the computing system 104 is configured to receive the request from the user to select a target from one or more targets for an agent to perform one or more activities. The computing system 104 receives the one or more input parameters from the user, one or more external sources 110 or a combination thereof based on the received request. Further, the computing system 104 also generates an expected reward value for each of the one or more targets by applying the received request and the one or more input parameters to a trained value network based Artificial Neural Network (ANN) model. The computing system 104 determines a desired target among the one or more targets based on the generated expected reward value of each of the one or more targets by using the trained value network based ANN model or empirical estimation. Furthermore, the computing system 104 generates one or more actions to be executed by the agent corresponding to the selected target based on the received request, the received one or more input parameters, one or more desired targets, one or more dynamic parameters and the expected reward value by using a trained policy network based ANN model. The computing system 104 outputs the determined one or more actions to the agent, the one or more user devices 108 or a combination thereof associated with the user for performing the one or more activities.

Figure 2:
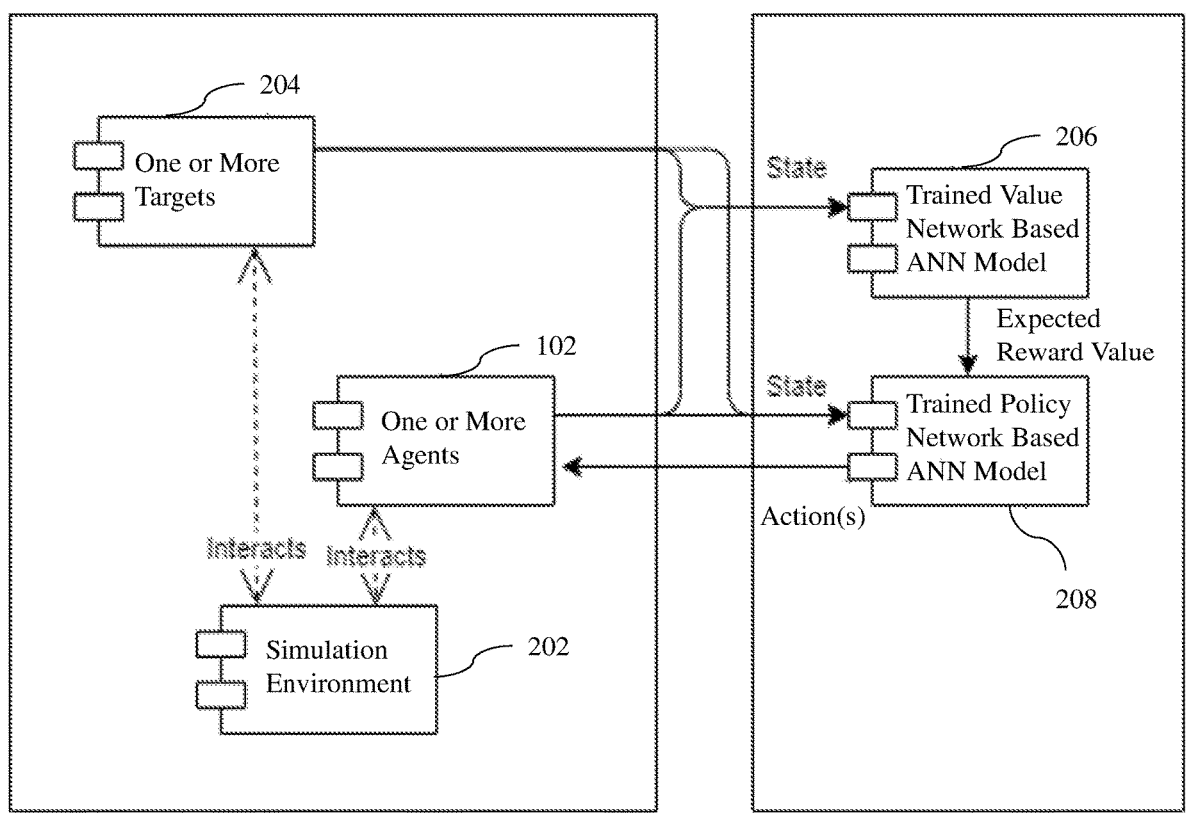
FIG. 2 is a schematic representation of a computing system, such as those shown in FIG. 1, for facilitating the autonomous target selection through the neural networks in accordance with an embodiment of the present disclosure.

FIG. 2 is a schematic representation of a computing system 104, such as those shown in FIG. 1, for facilitating autonomous target selection through neural networks in accordance with an embodiment of the present disclosure. The computing system 104 provides a simulation environment 202 to the one or more targets 204 and the one or more agents 102, such that the one or more targets 204 and one or more agents 102 may interact with the simulation environment 202. In an exemplary embodiment of the present disclosure, the one or more targets 204 may include one or more ground targets, one or more space targets, one or more air targets, one or more water targets or a combination thereof. Further, the one or more agents 102 include space crafts, land crafts, watercrafts and the like. In an embodiment of the present disclosure, one or more trained ANN models are used for the autonomous target selection. In an exemplary embodiment of the present disclosure, the one or more trained ANN models may include a trained value network based ANN model 206 and a trained policy network based ANN model 208. The trained ANN models may also include a thread network, a predictive network and the like for fast training of the value network based ANN model and the policy network based ANN model. In an alternate embodiment of the present disclosure, the one or more trained ANN models may also include convolutional neural network, a recurrent neural network, a connected neural network and the like. In an embodiment of the present disclosure, the one or more trained ANN models may be of same form and size. The computing system 104 may use a rectified linear unit, an exponential linear unit and the like as an activation layers in the one or more trained ANN models.

Further, the value network based ANN model receives a state of the one or more targets 204 and transmits an expected reward value to the trained policy network based ANN model 208. The trained policy network based ANN model 208 receives the state of the one or more agents 102 and transmits one or more actions to the one or more agents 102 for performing the one or more activities in accordance with the state of the one or more agents 102.

Figure 3:
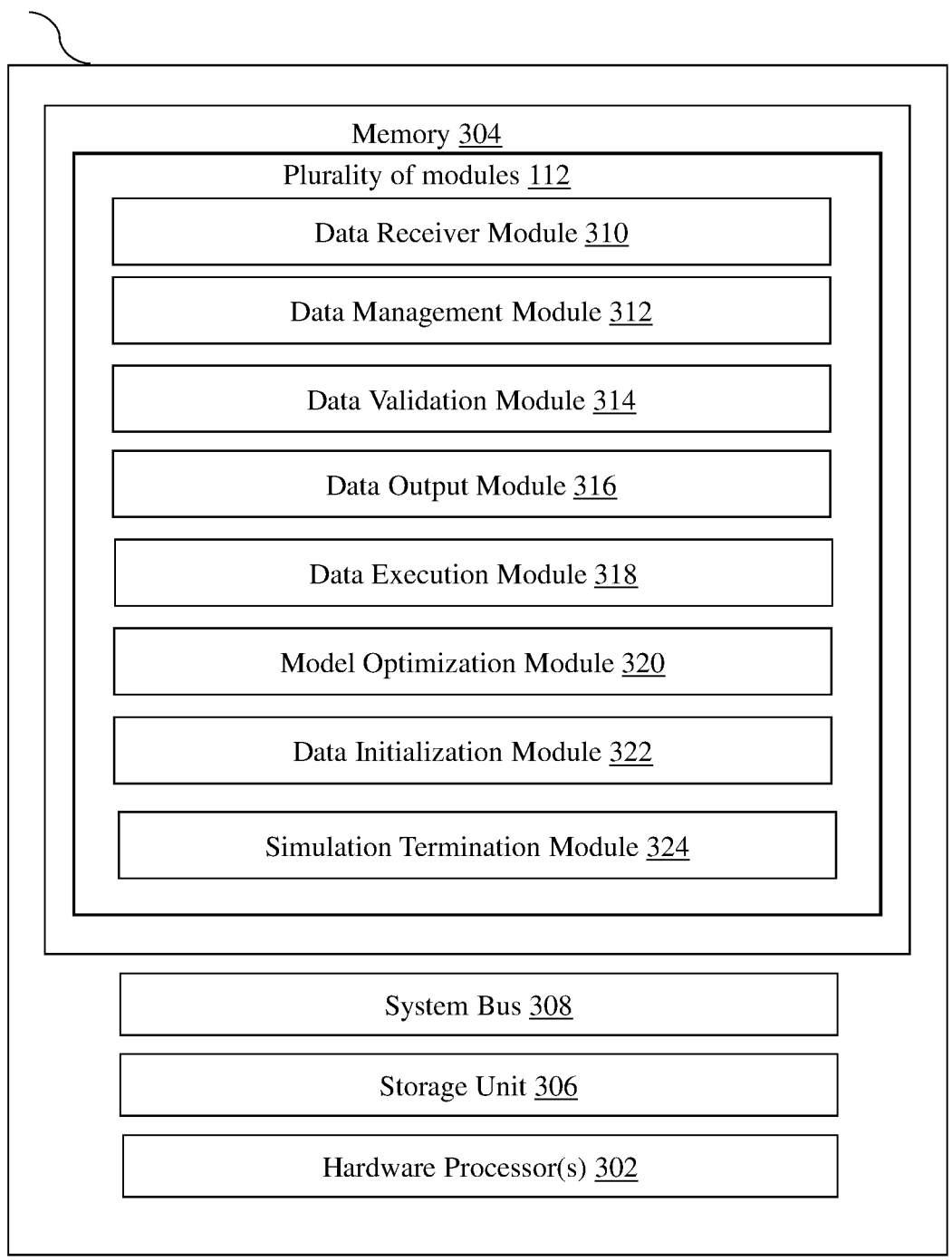
FIG. 3 is a block diagram illustrating an exemplary computing system, such as those shown in FIG. 1, for facilitating the autonomous target selection through the neural networks, in accordance with an embodiment of the present disclosure.

FIG. 3 is a block diagram illustrating an exemplary computing system 104 capable of facilitating autonomous target selection through neural networks. In an embodiment of the present disclosure the computing system 104 may be a central server, such as cloud server or a remote server. The computing system 104 comprises one or more hardware processors 302, a memory 304 and a storage unit 306. The one or more hardware processors 302, the memory 304 and the storage unit 306 are communicatively coupled through a system bus 308 or any similar mechanism. The memory 304 comprises a plurality of modules 112 in the form of programmable instructions executable by the one or more hardware processors 302. Further, the plurality of modules 112 includes a data receiver module 310, a data management module 312, a data validation module 314, a data output module 316, a data execution module 318, a model optimization module 320, a data initialization module 322 and a simulation termination module 324.

The one or more hardware processors 302, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 302 may also include embedded controllers, such as generic or programmable logic devices or arrays, application specific integrated circuits, single-chip computers, and the like.

The memory 304 may be non-transitory volatile memory and non-volatile memory. The memory 304 may be coupled for communication with the one or more hardware processors 302, such as being a computer-readable storage medium. The one or more hardware processors 302 may execute machine-readable instructions and/or source code stored in the memory 304. A variety of machine-readable instructions may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 304 includes the plurality of modules 112 stored in the form of machine-readable instructions on any of the above-mentioned storage media and may be in communication with and executed by the one or more hardware processors 302.

The storage unit 306 may be a cloud storage. The storage unit 306 may store one or more input parameters, expected reward value for each of one or more targets 204, one or more actions and one or more dynamic parameters. The storage unit 306 may also store one or more predefined simulation rules, error in the expected reward value, one or more initial parameters and one or more predefined termination states.

The data receiver module 310 is configured to receive a request from a user to select a target from one or more targets 204 for an agent to perform one or more activities. The user may be an agent operator, such as satellite operator. The one or more targets 204 refer to objects, point of attention or interaction, an area of interest for observation and the like. In an exemplary embodiment of the present disclosure, the one or more targets 204 include one or more ground targets, one or more space targets, one or more air targets, one or more water targets or a combination thereof. Further, the request include type of the agent, one or more targets 204 to be observed, types of the one or more targets 204, time to perform the one or more activities, priority of the one or more targets 204, recurring requirement of performing the one or more activities and the like. In an exemplary embodiment of the present disclosure, the one or more agents 102 include space crafts, land crafts, watercrafts and the like. In an exemplary embodiment of the present disclosure, the space craft may be a satellite. The one or more activities include capturing one or more images of the one or more targets 204, collection observation data of the one or more targets 204, interacting with the one or more targets 204 and the like.

Further, the data receiver module 310 is configured to receive one or more input parameters from the user, one or more external sources 110 or a combination thereof based on the received request. In an exemplary embodiment of the present disclosure, the one or more external sources 110 may be weather sources and the like. In an exemplary embodiment of the present disclosure, the one or more input parameters include relative state of the one or more targets 204 with respect to the agent, a normalized weightage of a target priority, target observation mission stage of a selected target, a situational awareness of external agents surrounding the agent, a situational awareness of external targets surrounding the one or more targets 204, a spatial freedom of motion of the agent, a target size, a target type, an inertial state of the agent, one or more agent states that would impact performance, target selection history, gravity, weather, motion of the agent, rotation of the agent, physical location of the one or more targets 204, potential opportunity of the external agents to make observation, observation history of the one or more targets 204 by the agent and the external collaborating agents, proximity of a target to angle of incidence, visibility, probability of downlink of data or any combination thereof. In an embodiment of the present disclosure, the target observation mission stage of the selected target may be active, inactive, moving and the like. The one or more agent states that would impact performance may be power, temperature, data storage state, actuator state, consumable levels and the like. Further, the target selection history includes a total cumulative time the one or more targets 204 are within a specified field of view, coverage spatial profile of the one or more targets 204 and the like. In an embodiment of the present disclosure, a grid representation of surrounding agents and surrounding targets may be used to provide the situational awareness to the agent. Furthermore, immediate obstacles surrounding the agent and the one or more targets and physical environment may also be used to provide physical constraint information to the agent.

The data management module 312 is configured to generate an expected reward value for each of the one or more targets 204 by applying the received request and the one or more input parameters to a trained value network based Artificial Neural Network (ANN) model 206. In an embodiment of the present disclosure, the expected reward value is associated with set target priority, state of craft, observation quality, timing of performing the one or more activities and the like. Further, the data management module 312 determines a desired target among the one or more targets 204 based on the generated expected reward value of each of the one or more targets 204 by using the trained value network based ANN model 206 or empirical estimation. In an embodiment of the present disclosure, the expected reward value associated with the desired target corresponds to a higher expected reward value. In an embodiment of the present disclosure, the trained value network based ANN model 206 is optional, such that the computing system 104 may operate without using the trained value network based ANN model 206. In an embodiment of the present disclosure, an expected reward value may be generated corresponding to a set of agents, such that the desired target may be determined based on the expected reward value. The set of agents are different from the agent.

The data validation module 314 is configured to validate the generated expected reward value for each of the one or more targets 204 and the determined desired target in a simulation environment 202 based on one or more predefined simulation rules. When the generated expected reward value for each of the one or more targets 204 and the determined desired target give errors in the simulation environment 202, the one or more predefined simulation rules may facilitate determination of cause of the errors.

Furthermore, the data management module 312 generates one or more actions to be executed by the agent corresponding to the desired target based on the received request, the received one or more input parameters, the desired target, one or more dynamic parameters and the expected reward value by using a trained policy network based ANN model 208. In an embodiment of the present disclosure, the data management module 312 may also consider the expected reward value and the determined desired target corresponding to the set of agents to generate the one or more actions. The term 'action' refers to the target under consideration as an input state in the form of relative state, such as range, range rate, relative orientation and the like, to the target. In an exemplary embodiment of the present disclosure, the one or more actions include slew the agent towards the desired target, take no action, slew to a default state, keep custody of the desired target, change the desired target and the like. The one or more dynamic parameters include changing weather, changing environmental conditions, changing state of the agent and surrounding agents, changing states of the target and of other targets, total time left to execute the one or more actions and the like.

Further, the data management module 312 updates a list of available targets from the one or more targets 204 after a predefined interval of time. In an embodiment of the present disclosure, when the data management module 312 does not select the desired target in previous cycle or the desired target is no longer available based on target access update, a new target may be selected from the available targets based on predefined target selection policy. In an exemplary embodiment of the present disclosure, the target selection policy may include exploration-exploitation policy.

In an embodiment of the present disclosure, the data management module 312 is configured to determine an action schedule corresponding to the one or more targets 204 based on the received request, the received one or more input parameters and the one or more dynamic parameters by using the trained policy network based ANN model 208. The action schedule includes a set of actions to be executed by the agent corresponding to each of the one or more targets 204 and time of executing the set of actions by the agent corresponding to each of the one or more targets 204.

The data output module 316 is configured to output the determined one or more actions to the agent, one or more user devices 108 associated with the user or a combination thereof for performing the one or more activities. In an exemplary embodiment of the present disclosure, the one or more user devices 108 may include a laptop computer, desktop computer, tablet computer, smartphone, wearable device, smart watch and the like.

The data execution module 318 is configured to execute the generated one or more actions by the agent to perform the one or more activities. For example, a satellite may be slewed in direction of a target to capture one or more images of the target.

In an embodiment of the present disclosure, before using the trained value network based ANN model 206 and the trained policy network based ANN model 208, value network based ANN model and policy network based ANN model is trained. The value network based ANN model is trained based on the received request and the one or more input parameters to generate the expected reward value for each of the one or more targets 204. Further, the policy network based ANN model is trained based ANN model based on the received request, the received one or more input parameters, the desired target, the one or more dynamic parameters and the expected reward value corresponding to the desired target to determine the one or more actions to be executed by the agent. In an embodiment of the present disclosure, the policy network based ANN model may be trained after training the value network based ANN model as the policy network based ANN model learns from the value network based ANN model.

The model optimization module 320 is configured to generate an actual reward value corresponding to the desired target upon executing the generated one or more actions by the agent by using the trained policy network based ANN model 208. Further, the model optimization module 320 computes an error in the expected reward value corresponding to the desired target based on difference between the expected reward value and the actual reward value by using the trained value network based ANN model 206. The model optimization module 320 updates learning of the trained value network based ANN model 206 based on the computed error by using reinforcement learning. In an exemplary embodiment of the present disclosure, reinforcement learning is performed by using Stochastic Gradient Descent (SGD). Furthermore, the trained value network based ANN model 206 updates one or more value network parameters at a predefined rate based on the computed error. In an embodiment of the present disclosure, the one or more value network parameters may be updated by back-propagation of the computed error between n-step expected reward value and corresponding actual reward value. In an exemplary embodiment of the present disclosure, the learning of the trained value network based ANN model 206 is updated for one or more training sessions until a desired expected reward value is achieved based on the computed error. In an embodiment of the present disclosure, reinforcement learning may include state-Action-Reward-State-Action (SARSA) technique and the like. The 'SARSA' refers to an algorithm for learning a Markov decision process policy, used in reinforcement learning area of machine learning which reflects the fact that the main function for updating a value in the neural network depends on the current state of the agent "S1", the action the agent chooses "A1", the reward "R" the agent gets for choosing this action, the state "S2" that the agent enters after taking that action, and finally the next action "A2" the agent chooses in its new state Further, the model optimization module 320 generates an updated expected reward value for each of the one or more targets 204 by applying the received request and the one or more input parameters to the updated trained value network based ANN model 206. The model optimization module 320 determines a different target among the one or more targets 204 based on the updated expected reward value of each of the one or more targets 204 by using the updated trained value network based ANN model 206. In an embodiment of the present disclosure, the updated expected reward value associated with the different target corresponds to a higher updated expected reward value.

In an embodiment of the present disclosure, a discount factor may be applied such that future rewards have a discounted influence on prior steps, as is commonly applied in prior art for n-step reinforcement learning. In an embodiment of the present disclosure, the discount factor may be used during training of the ANN models, such that rewards experienced near immediately after an action is performed is taking into greater considerations compared to future rewards, where the association between such future reward and the action taken diminishes. Further, several concurrent simulation episodes may update a common value network based ANN model through neural network gradients obtained from the difference between the actual reward value and the expected reward value. In an embodiment of the present disclosure, one or more optimization functions such as stochastic gradient descent and the like, may be used to compute the gradients during backpropagation to train one or more neural network parameters. The backpropagation for the policy network based ANN model uses reinforcement learning, such as the REINFORCE method, known in the prior art. In an embodiment of the present disclosure, the expected reward value may be based on a use-case specific rewards function, which can be empirical or in the form of a separate neural network. The reward functions may be an empirical function which maximizes the target acquisition period, diversity in the one or more targets 204, the target importance and the like.

Further, the model optimization module 320 updates learning of the trained policy network based ANN model 208 based on the determined different target and the updated expected reward value corresponding to the determined different target by using reinforcement learning. In an embodiment of the present disclosure, the trained policy network based ANN model 208 updates one or more policy network parameters at predefined rate based on the determined different target and the updated expected reward value corresponding to the determined different target. The learning of the trained policy network based ANN model 208 is updated for one or more training sessions until optimal one or more actions are determined based on the updated expected reward value. Furthermore, the model optimization module 320 determines one or more actions to be executed by the agent corresponding to the determined different target based on the received request, the received one or more input parameters, the different target, one or more dynamic parameters and the updated expected reward value by using the updated policy network based ANN model.

In an embodiment of the present disclosure, training process of the value network based ANN model and policy network based ANN model may be terminated using one or more approaches. In an exemplary embodiment of the present disclosure, the one or more approaches include manually terminating the training process, automatically terminating the training process upon completing a predefined number of training sessions and the like. In an embodiment of the present disclosure, the one or more value network parameters, the one or more policy network parameters, training progress and the like are stored in the storage unit 306 for future use before terminating the training session.

The data initialization module 322 is configured to initialize each of the one or more training sessions with one or more initial parameters. In an exemplary embodiment of the present disclosure, the one or more training sessions include concurrent execution of one or more simulation episodes from a start time to an end time. Further, the one or more initial parameters include a random parameter, a specific parameter and a prior learning session parameter. In an embodiment of the present disclosure, each of the one or more simulation episodes include a starting condition. In an exemplary embodiment of the present disclosure, the starting condition includes initializing a dynamic state of the one or more agents 102, the one or more targets 204 and the environment. The term 'simulation episode' refers to an episode as a simulation run with starting states for the agents, the one or more targets 204 and the simulation environment 202, progressing through simulated state transitions, and ending either through a triggering event or at a specified end time. In one embodiment, a multithreaded computing environment may be utilized to implement concurrence of simulation episodes. In another embodiment, the one or more agents 102 within the simulation episode may be trained concurrently through multiple threads, or consecutively using the simulation episode specific thread.

In an embodiment of the present disclosure, starting condition for multi parallel simulation episodes may be different or identical between one or more simulation episodes. Further, the starting condition of the training sessions may be fixed or varied. In an embodiment of the present disclosure, during each episode cycle, each agent performs autonomous target selection within the episode cycle for training of the value network based ANN model. The desired target for each step in the episode cycle may be based on an exploration-exploitation policy, such as the ε-greedy policy. As used herein, the term 'exploration-exploitation' refers to the autonomous target selection wherein either the target resulting in the optimal value network return is selected, or a random target is selected to encourage exploration.

In an embodiment of the present disclosure, a thread network, a predictive network and the like are used for fast training of the value network based ANN model and the policy network based ANN model. The thread network may be used where fast training is performed concurrently by the one or more agents 102 in the same simulation episode. In an embodiment of the present disclosure, the predicted network may be omitted such that the thread network may be used to perform final step prediction.

The simulation termination module 324 is configured to terminate each of the one or more simulation episodes upon reaching one or more predefined termination states in the simulation episode. In an exemplary embodiment of the present disclosure, the one or more predefined termination states include a loss of the agent, a loss of the one or more targets 204, completion of the one or more activities and the like. In an embodiment of the present disclosure, when the desired target is no longer available, the target selection task is set as terminated. In another embodiment of the present disclosure, when desired target is still available, then the desired target is maintained as a current step action within the n-step fast training cycle, and transition reward from previous to current state is computed based on rewards function and stored in a replay sequence buffer for last transition.

In operation, the computing system 104 receives a request from the user to select a target from the one or more targets 204 for the agent to perform the one or more activities. Further, the computing system 104 receives the one or more input parameters from the user, the one or more external sources 110 or a combination thereof based on the received request. The computing system 104 generates the expected reward value for each of the one or more targets 204 by applying the received request and the one or more input parameters to the trained value network based ANN model 206. Furthermore, the computing system 104 determines the desired target among the one or more targets 204 based on the generated expected reward value of each of the one or more targets 204 by using the trained value network based ANN model 206 or the empirical estimation. The computing system 104 generates the one or more actions to be executed by the agent corresponding to the desired target based on the received request, the received one or more input parameters, the desired target, one or more dynamic parameters and the expected reward value by using the trained policy network based ANN model 208. Further, the computing system 104 outputs the determined one or more actions to the agent, the one or more user devices 108 or a combination thereof associated with the user for performing the one or more activities.

Figure 4:
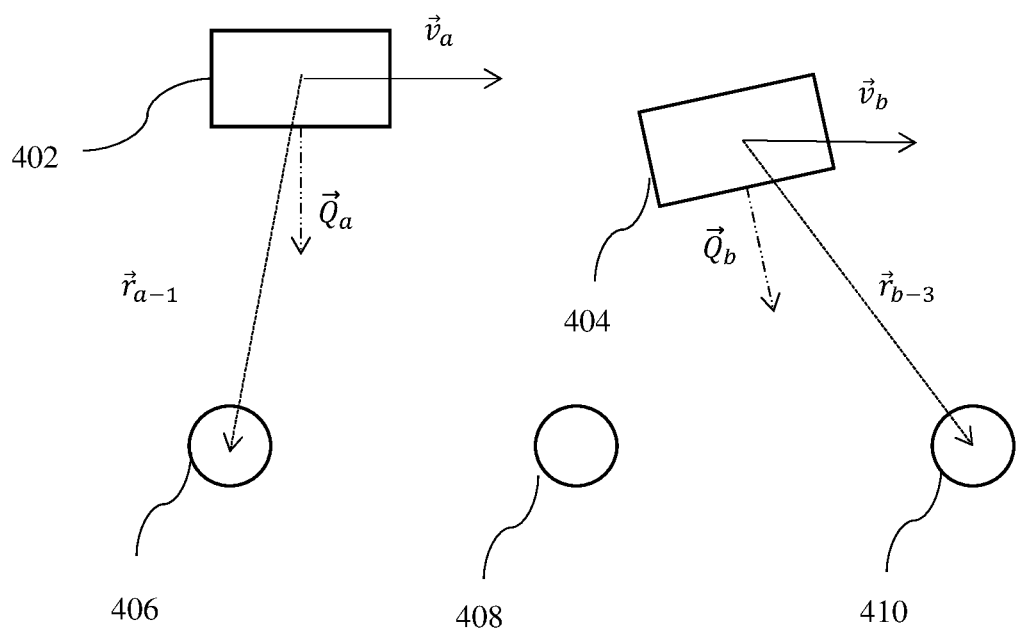
FIG. 4 is a two-dimensional schematic representation of a plurality of agents performing autonomous target selection in accordance with an embodiment of the present disclosure.

FIG. 4 is a two-dimensional schematic representation of a plurality of agents performing autonomous target selection in accordance with an embodiment of the present disclosure. In a specific embodiment of the present disclosure, FIG. 4 depicts two-dimensional representation of two agents, three targets and how the desired target selected by each of the two agents relates to a relative state between agents and targets. In an embodiment of the present disclosure, agent to target ranges ($\vec{r}_{a-1}$, $\vec{r}_{b-3}$), agents' orientations ($\vec{Q}_a$, $\vec{Q}_b$), and agents' relative motion ($\vec{v}_a$, $\vec{v}_b$) are depicted in FIG. 5 to illustrate sample input parameters for autonomous target selection. The two agents are agent A 402, agent B 404 and the three targets are target 1 406, target 2 408 and target 3 410. In an exemplary embodiment of the present disclosure, the agent A 402 selects the target 1 406 and the agent B 404 selects the target 3 410 by using reinforcement learning method. In an embodiment of the present disclosure, an expected reward value for each of the targets 406, 408, 410 is generated by applying the request received from the user and the input parameters to the trained value network based Artificial Neural Network (ANN) model 206. Further, the target 1 406 and the target 3 410 are assigned to the agent A 402 and agent B 404, respectively based on the expected reward value for each of the targets 406, 408, 410.

Figure 5A:
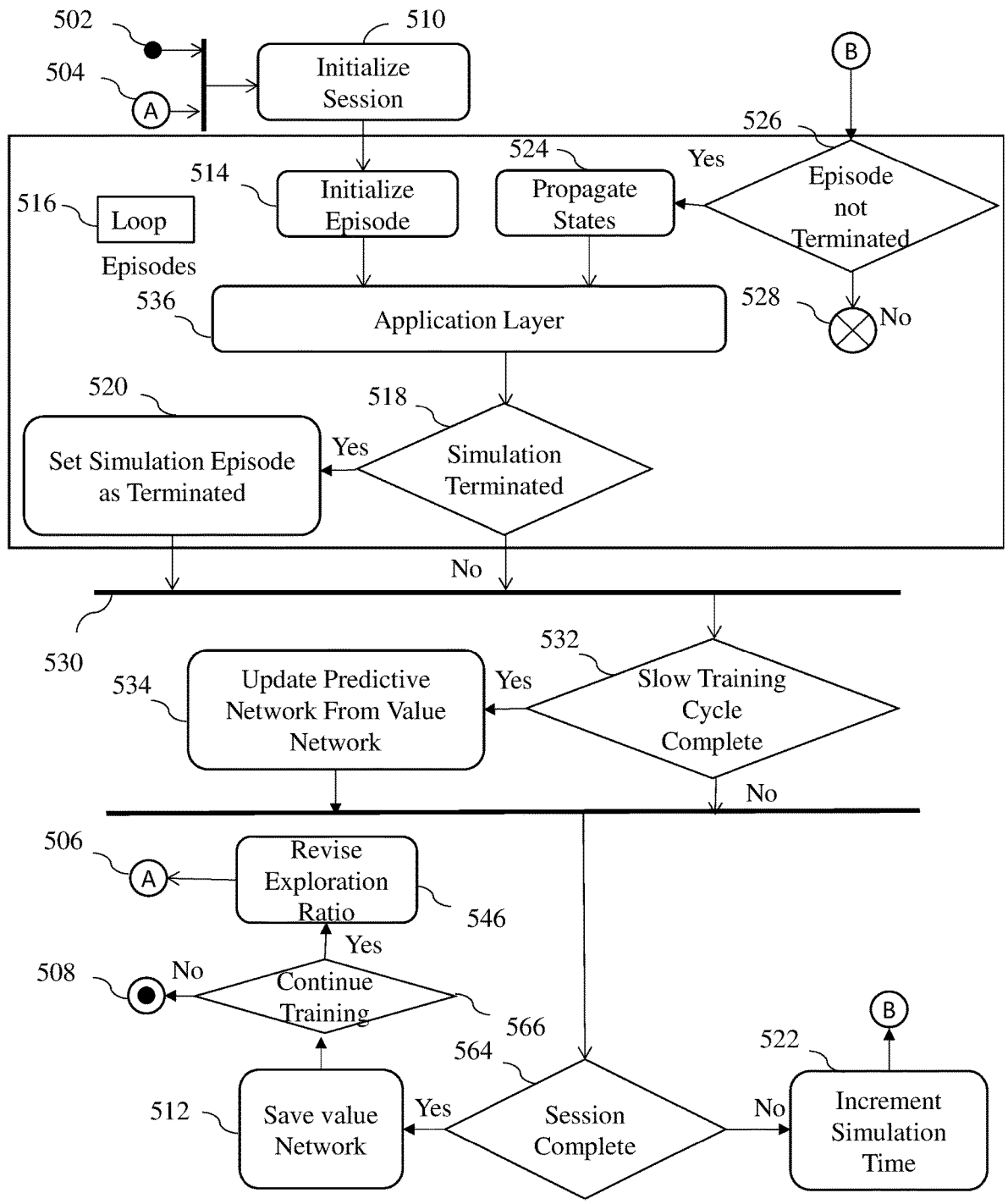
FIG. 5A is a flow chart representation illustrating training of the neural networks, in accordance with an embodiment of the present disclosure.
Figure 5B:
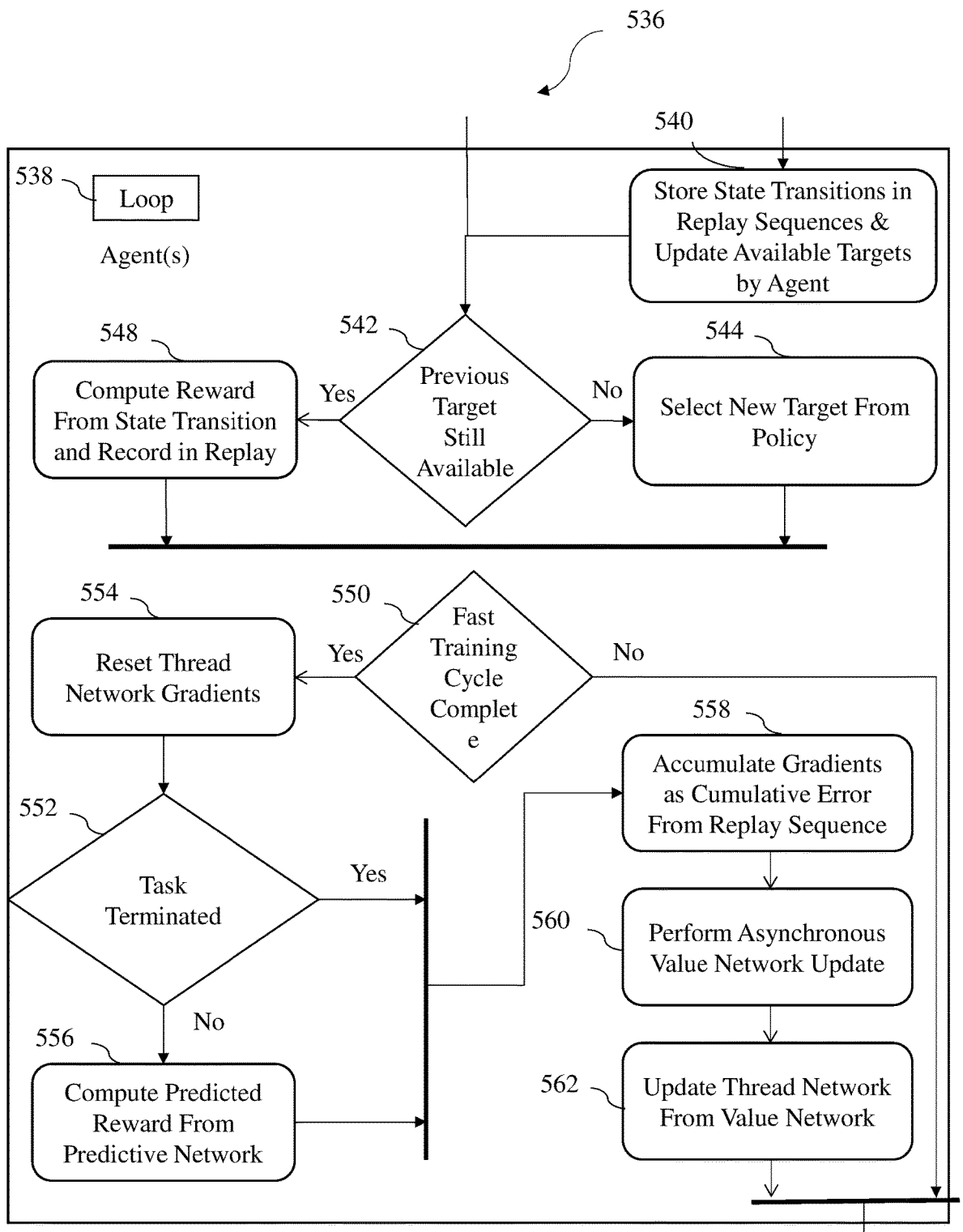
FIG. 5B is a flow chart representation illustrating training layer, in accordance with an embodiment of the present disclosure.

FIG. 5A is a flow chart representation illustrating training of the neural networks, in accordance with an embodiment of the present disclosure. FIG. 5B is a flow chart representation illustrating training layer, in accordance with an embodiment of the present disclosure. The training of one or more neural networks i.e., the value network based ANN model and the policy network based ANN model, is performed for the one or more training sessions. In an embodiment of the present disclosure, each training session corresponds to the concurrent execution of the one or more simulation episodes progressing from a start time 502, 504 to an end time 506, 508. The first training session starts at 502, whereas intermediate training sessions starts at 504 and ends at 506. Last training session ends at 508. The training session is initialized at 510, where the value network based ANN model is either initialized with initial parameters (random or specific), or set based on prior learning sessions saved at 512. All other networks including predictive network and thread network are initialized with parameters equal to the initialized one or more value network parameters at 510. The starting condition of each simulation episode including initial dynamic state of the one or more agents 102, the one or more targets 204 and the simulation environment 202, is initialized at 514. For multiple parallel simulation episodes in loop 516, the starting conditions may be different or identical between simulation episodes. These starting conditions may be fixed for all training sessions or varying between training sessions. At 518, it may be determined whether the simulation is terminated or not. In an embodiment of the present disclosure, a simulation episode may terminate at 520 if a predefined termination state is reached in the simulation episode, such as but not limited to, loss of agents, loss of targets or completion of mission. Training session time is incremented at 522. If the simulation episode did not terminate at 520, the simulation episode's simulation states of the simulation environment 202, the one or more agents 102 and the one or more targets 204 are propagated forward at 524 based on the incremented time. At step 526, it may be determined if the episode is terminated. If the simulation episode is marked for termination at 520, the simulation episode is terminated at 528 instead of performing 524. All concurrent simulation episodes are synchronized with the session at 530 after every episode cycle. At step 532, it may be determined if slow training cycle is complete. Alternatively, each simulation episode may execute on its own episode time incremented at 526 and synchronized with the session time at a lesser rate at 530 prior to every slow training cycle at 534. In an embodiment of the present disclosure, the simulation episode is completed for once when no slow training is performed (if the predictive network is omitted). At a pre-set slow training cycle rate, the parameters of the predictive network are updated based on the one or more value network parameters at 534. Further, a training layer 536 is shown in FIG. 5B. During each episode cycle, each agent performs autonomous target selection or training within 538, either consecutively or concurrently within the episode cycle, as shown in FIG. 5B. If consecutively, all agents share a common thread network associated with the episode. If concurrently, each agent makes use of a thread network associate with the agent. For each agent in loop 538, if the previous autonomous target selection task by the agent is completed or if no target has yet been selected, the agent's state replay sequence buffer is reset at 540, which is used to store n-step state-reward-state transitions. If a target was previously selected, a new state transition entry using the previously selected target as action is added to the agent's transition replay buffer. A list of available agents is updated by the agent at 540. At step 542, it may be determined if the previously selected target is no longer available. If the agent did not have a target selected in the previous cycle or the previously selected target is no longer available based on the target access update done in step 524, a new target is selected from the available targets based on the target selection policy at 544. The selection policy may select the next target either through exploration or exploitation. In an embodiment of the present disclosure, the exploration corresponds to a random target selection and the exploitation corresponds to the selected target producing the highest expected reward value from the current thread network. The choice of exploration versus exploitation may be based on the exploration ratio, which is initialized at an initial value at 502, and may be updated after each session at 546. In an embodiment of the present disclosure, the exploration ratio is based on the current training session. It may be set that either exploration or exploitation is performed during training. In an exemplary embodiment of the present disclosure, implementation of the exploration/exploitation policy is the ε-greedy policy. At 544, when the previously selected target is no longer available, the target selection task is set as terminated. At 548, when the previously selected target is still available, the previous target is maintained as the current step action within the n-step fast training cycle, and the transition reward from previous to current state is computed based on the rewards function and stored in the replay sequence buffer for the last transition. At step 550, it may be determined if the n-step fast training cycle is complete. The termination flag is reset at step 548 (or alternatively at step 540). At step 552, it may be determined if the task is terminated or not. When the n-step fast training cycle is complete, either due to task being terminated in 544, or the maximum number of steps has been reached (n-steps), reset the current thread network gradients at 554. Steps 554 to step 562 corresponds to the n-SaRS fast training cycle which may update the value network based ANN model based on the error between the actual reward value compared against the expected reward value from the thread network and predictive network (if used). If the task is terminated, leave the final reward value as zero in the latest replay transition sequence entry at 552. If the task is not terminated (final step in n-steps is reached), compute the final reward value as the output of the predictive network and store in the latest transition replay sequence entry at 556. Alternatively, the current thread network or the value network based ANN model can serve as the predictive network, and the predictive network can be omitted completely. In step 558, the gradients are computed as the cumulative gradients from each replay sequence state-reward-state transition, similar to n-step Q-learning approach. In an embodiment of the present disclosure, the expected reward value from the thread network based on the starting state for each replay sequence transition is compared with the actual reward value for all later steps as recorded in the transition replay sequence. For every step (replay sequence transitions), the computed error is backpropagated using the optimization method of choice to produce the network gradients. A discount factor may be applied to discount future steps compared to earlier steps. In step 560, the cumulative gradients from 558 are used to update the common value network based ANN model. In an embodiment of the present disclosure, the gradients serve as corrections to the network parameters. At step 562, the current thread network is updated using the updated value network based ANN model. Alternatively, step 562 may be performed at step 534, where slow-training may imply updating all thread networks at a set rate with the updated value network based ANN model, instead of, or in combination with, updating the common predictive network. The thread network can be updated with the value network based ANN model after every X number of cycles, either after a synchronization of the simulation episode with the training session, or asynchronously within the simulation episode. At step 564, it may be determined if the simulation session is completed. When the simulation episode is completed, the value network based model is saved else simulation time is incremented. At step 566, it may be determined if the training is required to be continued. When the training is required to be continued, the exploration ratio is revised else the training session ends. At 512, after each training session, the one or more value network parameters can be stored to preserve the training progress for future use. The training is completed at 508 either by manually terminating the training or when a predefined number of training sessions is reached.

Figure 6:
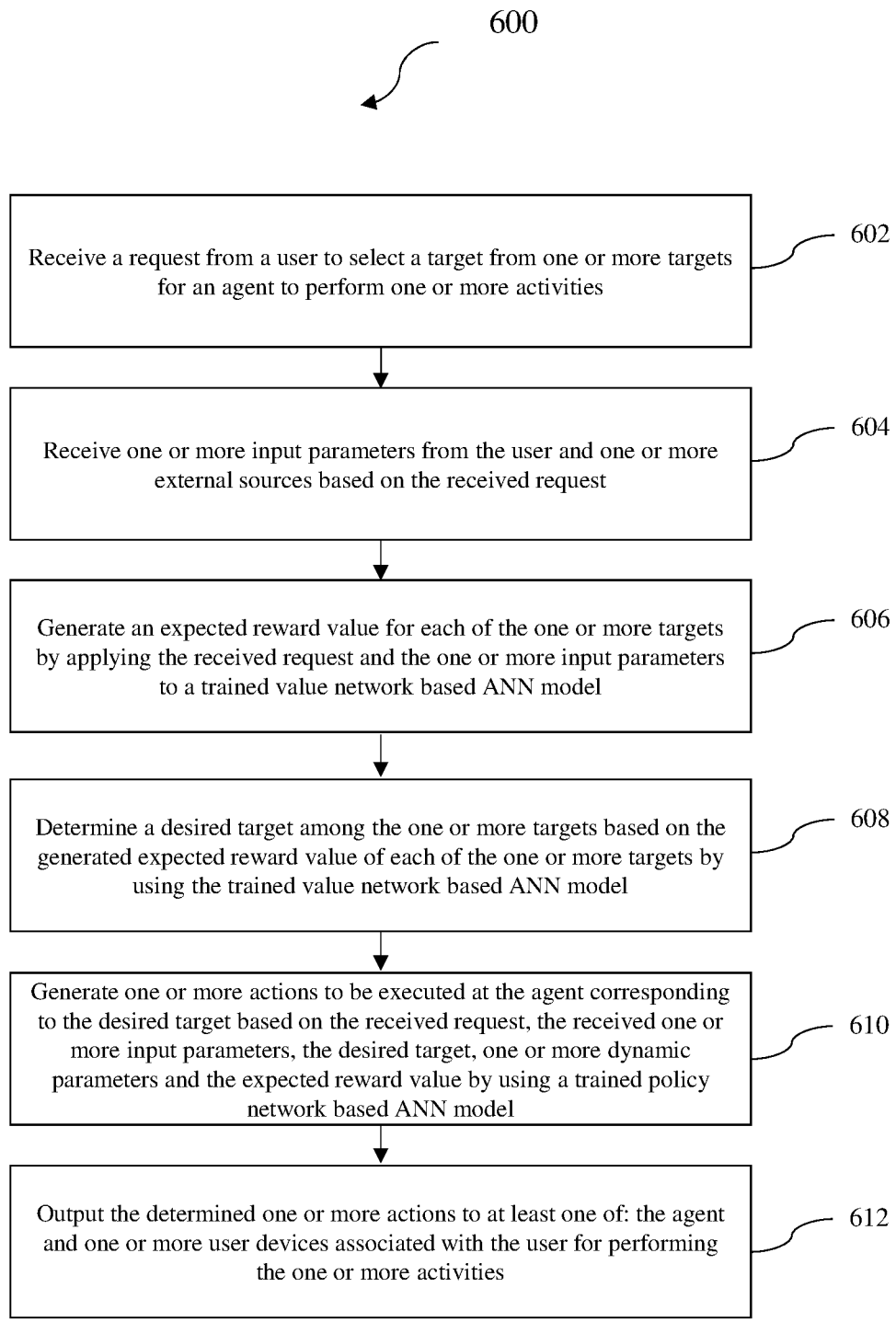
FIG. 6 is a process flow diagram illustrating an exemplary method for facilitating the autonomous target selection through the neural networks, in accordance with an embodiment of the present disclosure.

FIG. 6 is a process flow diagram illustrating an exemplary method for facilitating the autonomous target selection through the neural networks, in accordance with an embodiment of the present disclosure. At step 602, a request is received from a user to select a target from one or more targets 204 for an agent to perform one or more activities. The user may be an agent operator, such as satellite operator. The one or more targets 204 refer to objects, point of attention or interaction, an area of interest for observation and the like. In an exemplary embodiment of the present disclosure, the one or more targets 204 include one or more ground targets, one or more space targets, one or more air targets, one or more water targets or a combination thereof. Further, the request include type of the agent, one or more targets 204 to be observed, types of the one or more targets 204, time to perform the one or more activities, priority of the one or more targets 204, recurring requirement of performing the one or more activities and the like. In an exemplary embodiment of the present disclosure, the one or more agents 102 include space crafts, land crafts, watercrafts and the like. In an exemplary embodiment of the present disclosure, the space craft may be a satellite. The one or more activities include capturing one or more images of the one or more targets 204, collecting observation data of the one or more targets 204, interacting with the one or more targets 204 and the like.

At step 604, one or more input parameters are received from the user, one or more external sources 110 or a combination thereof based on the received request. In an exemplary embodiment of the present disclosure, the one or more external sources 110 may be weather department and the like. In an exemplary embodiment of the present disclosure, the one or more input parameters include relative state of the one or more targets 204 with respect to the agent, a normalized weightage of a target priority, target observation mission stage of a selected target, a situational awareness of external agents surrounding the agent, a situational awareness of external targets surrounding the one or more targets 204, a spatial freedom of motion of the agent, a target size, a target type, an inertial state of the agent, one or more agent states that would impact performance, target selection history, gravity, weather, motion of the agent, rotation of the agent, physical location of the one or more targets 204, potential opportunity of the external agents to make observation, observation history of the one or more targets 204 by the agent and the external collaborating agents, proximity of a target to angle of incidence, visibility, probability of downlink of data or any combination thereof. In an embodiment of the present disclosure, the target observation mission stage of the selected target may be active, inactive, moving and the like. The one or more agent states that would impact performance may be power, temperature, data storage state, actuator state, consumable levels and the like. Further, the target selection history includes a total cumulative time the one or more targets 204 are within a specified field of view, coverage spatial profile of the one or more targets 204 and the like. In an embodiment of the present disclosure, a grid representation of surrounding agents and surrounding targets may be used to provide the situational awareness to the agent. Furthermore, immediate obstacles surrounding the agent and the one or more targets and physical environment may also be used to provide physical constraint information to the agent.

At step 606, an expected reward value for each of the one or more targets 204 is generated by applying the received request and the one or more input parameters to a trained value network based Artificial Neural Network (ANN) model 206. In an embodiment of the present disclosure, the expected reward value is associated with set target priority, state of craft, observation quality, timing of performing the one or more activities and the like.

At step 608, a desired target among the one or more targets 204 is determined based on the generated expected reward value of each of the one or more targets 204 by using the trained value network based ANN model 206 or empirical estimation. In an embodiment of the present disclosure, the expected reward value associated with the desired target corresponds to a higher expected reward value. In an embodiment of the present disclosure, the trained value network based ANN model 206 is optional. In an embodiment of the present disclosure, an expected reward value may be generated corresponding to a set of agents, such that the desired target may be determined based on the expected reward value. The set of agents are different from the agent.

Further, the method 600 includes validating the generated expected reward value for each of the one or more targets 204 and the determined desired target in a simulation environment 202 based on one or more predefined simulation rules. When the generated expected reward value for each of the one or more targets 204 and the determined desired target give errors in the simulation environment 202, the one or more predefined simulation rules may facilitate determination of cause of the errors.

At step 610, one or more actions to be executed by the agent corresponding to the desired target are generated based on the received request, the received one or more input parameters, the desired target, one or more dynamic parameters and the expected reward value by using a trained policy network based ANN model 208. In an embodiment of the present disclosure, the expected reward value and the determined desired target corresponding to the set of agents may be considered to generate the one or more actions. The term 'action' refers to the target under consideration as an input state in the form of relative state, such as range, range rate, relative orientation and the like, to the target. In an exemplary embodiment of the present disclosure, the one or more actions include slew the agent towards the desired target, take no action, slew to a default state, keep custody of the desired target, change the desired target and the like. The one or more dynamic parameters include changing weather, changing environmental conditions, changing state of the agents and surrounding agents, changing states of the target and of other targets, total time left to execute the one or more actions and the like.

Furthermore, the method 600 includes updating a list of available targets from the one or more targets 204 after a predefined interval of time. In an embodiment of the present disclosure, when the desired target may not be selected in previous cycle or the desired target is no longer available based on target access update, a new target may be selected from the available targets based on predefined target selection policy. In an exemplary embodiment of the present disclosure, the target selection policy may include exploration-exploitation policy.

In an embodiment of the present disclosure, the method 600 includes determining an action schedule corresponding to the one or more targets 204 based on the received request, the received one or more input parameters and the one or more dynamic parameters by using the trained policy network based ANN model 208. The action schedule includes a set of actions to be executed by the agent corresponding to each of the one or more targets 204 and time of executing the set of actions by the agent corresponding to each of the one or more targets 204.

At step 612, the determined one or more actions are outputted to the agent, one or more user devices 108 associated with the user or a combination thereof for performing the one or more activities. In an exemplary embodiment of the present disclosure, the one or more user devices 108 may include a laptop computer, desktop computer, tablet computer, smartphone, wearable device, smart watch and the like.

Further, the method 600 includes executing the generated one or more actions by the agent to perform the one or more activities. For example, a satellite may be slewed in direction of a target to capture one or more images of the target.

In an embodiment of the present disclosure, before using the trained value network based ANN model 206 and the trained policy network based ANN model 208, value network based ANN model and policy network based ANN model is trained. The value network based ANN model is trained based on the received request and the one or more input parameters to generate the expected reward value for each of the one or more targets 204. Further, the policy network based ANN model is trained based ANN model based on the received request, the received one or more input parameters, the desired target, the one or more dynamic parameters and the expected reward value corresponding to the desired target to determine the one or more actions to be executed by the agent. In an embodiment of the present disclosure, the policy network based ANN model may be trained after training the value network based ANN model as the policy network based ANN model learns from the value network based ANN model.

Furthermore, the method 600 includes generating an actual reward value corresponding to the desired target upon executing the generated one or more actions by the agent by using the trained policy network based ANN model 208. Further, the method 600 includes computing an error in the expected reward value corresponding to the desired target based on difference between the expected reward value and the actual reward value by using the trained value network based ANN model 206. The method 600 includes updating learning of the trained value network based ANN model 206 based on the computed error by using reinforcement learning. In an exemplary embodiment of the present disclosure, reinforcement learning is performed by using Stochastic Gradient Descent (SGD). Furthermore, the trained value network based ANN model 206 updates one or more value network parameters at a predefined rate based on the computed error. In an embodiment of the present disclosure, the one or more value network parameters may be updated by back-propagation of the computed error between n-step expected reward value and corresponding actual reward value. In an exemplary embodiment of the present disclosure, the learning of the trained value network based ANN model 206 is updated for one or more training sessions until a desired expected reward value is achieved based on the computed error. In an embodiment of the present disclosure, reinforcement learning may include state-Action-Reward-State-Action (SARSA) technique and the like. The 'SARSA' refers to an algorithm for learning a Markov decision process policy, used in reinforcement learning area of machine learning which reflects the fact that the main function for updating a value in the neural network depends on the current state of the agent "S1", the action the agent chooses "A1", the reward "R" the agent gets for choosing this action, the state "S2" that the agent enters after taking that action, and finally the next action "A2" the agent chooses in its new state Further, the method 600 includes generating an updated expected reward value for each of the one or more targets 204 by applying the received request and the one or more input parameters to the updated trained value network based ANN model 206. The method 600 includes determining a different target among the one or more targets 204 based on the updated expected reward value of each of the one or more targets 204 by using the updated trained value network based ANN model 206. In an embodiment of the present disclosure, the updated expected reward value associated with the different target corresponds to a higher updated expected reward value.

In an embodiment of the present disclosure, a discount factor may be applied such that future rewards have a discounted influence on prior steps, as is commonly applied in prior art for n-step reinforcement learning. In an embodiment of the present disclosure, the discount factor may be used during training of the ANN models, such that rewards experienced near immediately after an action is performed is taking into greater considerations compared to future rewards, where the association between such future reward and the action taken diminishes. Further, several concurrent simulation episodes may update a common value network based ANN model through neural network gradients obtained from the difference between the actual reward value and the expected reward value. In an embodiment of the present disclosure, one or more optimization functions such as stochastic gradient descent and the like, may be used to compute the gradients during backpropagation to train one or more neural network parameters. The backpropagation for the policy network based ANN model uses reinforcement learning, such as the REINFORCE method, known in the prior art. In an embodiment of the present disclosure, the expected reward value may be based on a use-case specific rewards function, which can be empirical or in the form of a separate neural network. The reward functions may be an empirical function which maximizes the target acquisition period, diversity in the one or more targets 204, the target importance and the like.

Further, the method 600 includes updating learning of the trained policy network based ANN model 208 based on the determined different target and the updated expected reward value corresponding to the determined different target by using reinforcement learning. In an embodiment of the present disclosure, the trained policy network based ANN model 208 updates one or more policy network parameters at predefined rate based on the determined different target and the updated expected reward value corresponding to the determined different target. The learning of the trained policy network based ANN model 208 is updated for one or more training sessions until optimal one or more actions are determined based on the updated expected reward value. Furthermore, the method 600 includes determining one or more actions to be executed by the agent corresponding to the determined different target based on the received request, the received one or more input parameters, the different target, one or more dynamic parameters and the updated expected reward value by using the updated policy network based ANN model.

In an embodiment of the present disclosure, training process of the value network based ANN model and policy network based ANN model may be terminated using one or more approaches. In an exemplary embodiment of the present disclosure, the one or more approaches include manually terminating the training process, automatically terminating the training process upon completing a predefined number of training sessions and the like. In an embodiment of the present disclosure, the one or more value network parameters, the one or more policy network parameters, training progress and the like are stored in the storage unit 306 for future use before terminating the training session.

Furthermore, the method 600 includes initializing each of the one or more training sessions with one or more initial parameters. In an exemplary embodiment of the present disclosure, the one or more training sessions include concurrent execution of one or more simulation episodes from a start time to an end time. Further, the one or more initial parameters include a random parameter, a specific parameter and a prior learning session parameter. In an embodiment of the present disclosure, each of the one or more simulation episodes include a starting condition. In an exemplary embodiment of the present disclosure, the starting condition includes initializing a dynamic state of the one or more agents 102, the one or more targets 204 and the environment. The term 'simulation episode' refers to an episode as a simulation run with starting states for the agents, the one or more targets 204 and the simulation environment 202, progressing through simulated state transitions, and ending either through a triggering event or at a specified end time. In one embodiment, a multithreaded computing environment may be utilized to implement concurrence of simulation episodes. In another embodiment, the one or more agents 102 within the simulation episode may be trained concurrently through multiple threads, or consecutively using the simulation episode specific thread.

In an embodiment of the present disclosure, starting condition for multi parallel simulation episodes may be different or identical between one or more simulation episodes. Further, the starting condition of the training sessions may be fixed or varied. In an embodiment of the present disclosure, during each episode cycle, each agent performs autonomous target selection within the episode cycle for training of the value network based ANN model. The desired target for each step in the episode cycle may be based on an exploration-exploitation policy, such as the ε-greedy policy. As used herein, the term 'exploration-exploitation' refers to the autonomous target selection wherein either the target resulting in the optimal value network return is selected, or a random target is selected to encourage exploration.

In an embodiment of the present disclosure, a thread network, a predictive network and the like are used for fast training of the value network based ANN model and the policy network based ANN model. The thread network may be used where fast training is performed concurrently by the one or more agents 102 in the same simulation episode. In an embodiment of the present disclosure, the predicted network may be omitted such that the thread network may be used to perform final step prediction.

Further, method 600 includes terminating each of the one or more simulation episodes upon reaching one or more predefined termination states in the simulation episode. In an exemplary embodiment of the present disclosure, the one or more predefined termination states include a loss of the agent, a loss of the one or more targets 204, completion of the one or more activities and the like. In an embodiment of the present disclosure, when the desired target is no longer available, the target selection task is set as terminated. In another embodiment of the present disclosure, when desired target is still available, then the desired target is maintained as a current step action within the n-step fast training cycle, and transition reward from previous to current state is computed based on rewards function and stored in a replay sequence buffer for last transition.

The method 600 may be implemented in any suitable hardware, software, firmware, or combination thereof.

Thus, various embodiments of the present computing system 104 provide a solution facilitate autonomous target selection through the neural networks. The computing system 104 provides an efficient solution for the autonomous target selection system trained validated through the simulation environment 202 to adapt to changing targets and environment conditions without manual reconfiguration, which reduces a need for human intervention up to a great extent as the system is autonomous. Further, the computing system 104 is able to retrain the same neural network for different mission priorities through revisions to the underlying rewards function, which increases the usability of the computing system 104 and makes the computing system 104 time efficient. Furthermore, the flexibility of the computing system 104 to incorporate additional inputs to influence the resulting target selection decision without significant reengineering effort makes the computing system 104 more efficient and faster.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 308 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for facilitating autonomous target selection through neural networks, the computing system comprising:
one or more hardware processors; and
a memory coupled to the one or more hardware processors, wherein the memory comprises a plurality of modules in the form of programmable instructions executable by the one or more hardware processors, wherein the plurality of modules comprises:
a data receiver module configured to:
receive a request from a user to select a target from one or more targets for an agent to perform one or more activities, wherein the request comprises: type of the agent, one or more targets to be observed, types of the one or more targets, time to perform the one or more activities, priority of the one or more targets and recurring requirement of performing the one or more activities, wherein the agent is one of: a space craft, land craft and water craft, wherein the one or more targets comprise: one or more ground targets, one or more space targets, one or more air targets and one or more water targets and wherein the one or more activities comprise: capturing one or more images of the one or more targets, collecting observation data of the one or more targets and interacting with the one or more targets;
receive one or more input parameters from at least one of: the user and one or more external sources based on the received request;
a data management module configured to:
generate an expected reward value for each of the one or more targets by applying the received request and the one or more input parameters to a trained value network based Artificial Neural Network (ANN) model;
determine a desired target among the one or more targets based on the generated expected reward value of each of the one or more targets by using one of: the trained value network based ANN model and empirical estimation, wherein the expected reward value associated with the desired target corresponds to a higher expected reward value;
generate one or more actions to be executed by the agent corresponding to the desired target based on the received request, the received one or more input parameters, the desired target, one or more dynamic parameters and the expected reward value by using a trained policy network based ANN model, wherein the one or more actions comprise: slew the agent towards the desired target, take no action, slew to a default state, keep custody of the desired target and change the desired target and wherein the one or more dynamic parameters comprise: changing weather, changing environmental conditions, changing states of the agent and surrounding agents, changing states of the target and of other targets and total time left to execute the one or more actions; and
a data output module configured to output the determined one or more actions to at least one of: the agent and one or more user devices associated with the user for performing the one or more activities.

2. The computing system of claim 1, wherein the one or more input parameters comprise at least one or combination of: a relative state of the one or more targets with respect to the agent, a normalized weightage of a target priority, target observation mission stage of a selected target, a situational awareness of external agents surrounding the agent, a situational awareness of external targets surrounding the one or more targets, a spatial freedom of motion of the agent, a target size, a target type, an inertial state of the agent, one or more agent states that would impact performance, target selection history, gravity, weather, motion of the agent, rotation of the agent, physical location of the one or more targets, potential opportunity of the external agents to make observation, observation history of the one or more targets by the agent and the external collaborating agents, proximity of a target to angle of incidence, visibility and probability of downlink of data.

3. The computing system of claim 1, wherein the expected reward value is associated with set target priority, state of craft, observation quality and timing of performing the one or more activities.

4. The computing system of claim 1, further comprises a data execution module configured to execute the generated one or more actions by the agent to perform the one or more activities.

5. The computing system of claim 1, further comprises a data validation module configured to validate the generated expected reward value for each of the one or more targets and the determined desired target in a simulation environment based on one or more predefined simulation rules.

6. The computing system of claim 1, further comprises a model optimization module configured to:
generate an actual reward value corresponding to the desired target upon executing the generated one or more actions by the agent by using the trained policy network based ANN model;
compute an error in the expected reward value corresponding to the desired target based on difference between the expected reward value and the actual reward value by using the trained value network based ANN model;
update learning of the trained value network based ANN model based on the computed error by using reinforcement learning, wherein reinforcement learning is performed by using Stochastic Gradient Descent (SGD), wherein the trained value network based ANN model updates one or more value network parameters based on the computed error and wherein the learning of the trained value network based ANN model is updated for one or more training sessions until a desired expected reward value is achieved based on the computed error;
generate an updated expected reward value for each of the one or more targets by applying the received request and the one or more input parameters to the updated trained value network based ANN model; and
determine a different target among the one or more targets based on the updated expected reward value of each of the one or more targets by using the updated trained value network based ANN model, wherein the updated expected reward value associated with the different target corresponds to a higher updated expected reward value.

7. The computing system of claim 6, wherein the model optimization module is configured to:

train the policy network based ANN model based on the received request, the received one or more input parameters, the desired target, the one or more dynamic parameters and the expected reward value to determine the one or more actions to be executes on the agent;

update learning of the trained policy network based ANN model based on the determined different target and the updated expected reward value corresponding to the determined different target by using reinforcement learning, wherein the trained policy network based ANN model updates one or more policy network parameters based on the determined different target and the updated expected reward value corresponding to the determined different target, wherein the learning of the trained policy network based ANN model is updated for one or more training sessions until optimal one or more actions are determined based on the updated expected reward value; and determine one or more actions to be executed by the agent corresponding to the determined different target based on the received request, the received one or more input parameters, the different target, one or more dynamic parameters and the updated expected reward value by using the updated policy network based ANN model.

8. The computing system of claim 7, further comprises a data initialization module configured to initialize each of the one or more training sessions with one or more initial parameters, wherein the one or more training sessions comprise: concurrent execution of one or more simulation episodes from a start time to an end time, wherein the one or more initial parameters comprise: a random parameter, a specific parameter and a prior learning session parameter, wherein each of the one or more simulation episodes comprise a starting condition and wherein the starting condition comprises: initializing a dynamic state of the one or more agents, the one or more targets and the environment.

9. The computing system of claim 8, further comprises a simulation termination module configured to terminate each of the one or more simulation episodes upon reaching one or more predefined termination states in the simulation episode, wherein the one or more predefined termination states comprise: a loss of the agent, a loss of the one or more targets and completion of the one or more activities.

10. The computing system of claim 1, wherein the data management module is configured to determine an action schedule corresponding to the one or more targets based on the received request, the received one or more input parameters and the one or more dynamic parameters by using the trained policy network based ANN model, wherein the action schedule comprises: a set of actions to be executed by the agent corresponding to each of the one or more targets and time of executing the set of actions by the agent corresponding to each of the one or more targets.

11. A method for facilitating autonomous target selection through neural networks, the method comprising:
receiving, by a one or more hardware processors, a request from a user to select a target from one or more targets for an agent to perform one or more activities, wherein the request comprises: type of the agent, one or more targets to be observed, types of the one or more targets, time to perform the one or more activities, priority of the one or more targets and recurring requirement of performing the one or more activities, wherein the agent is one of: a space craft, land craft and water craft, wherein the one or more targets comprise: one or more ground targets, one or more space targets, one or more air targets and one or more water targets and wherein the one or more activities comprise: capturing one or more images of the one or more targets, collecting observation data of the one or more targets and interacting with the one or more targets;

receiving, by the one or more hardware processors, one or more input parameters from at least one of: the user and one or more external sources based on the received request;

generating, by the one or more hardware processors, an expected reward value for each of the one or more targets by applying the received request and the one or more input parameters to a trained value network based Artificial Neural Network (ANN) model;

determining, by the one or more hardware processors, a desired target among the one or more targets based on the generated expected reward value of each of the one or more targets by using one of: the trained value network based ANN model and empirical estimation, wherein the expected reward value associated with the desired target corresponds to a higher expected reward value;

generating, by the one or more hardware processors, one or more actions to be executed by the agent corresponding to the desired target based on the received request, the received one or more input parameters, the desired target, one or more dynamic parameters and the expected reward value by using a trained policy network based ANN model, wherein the one or more actions comprise: slew the agent towards the desired target, take no action, slew to a default state, keep custody of the desired target and change the desired target and wherein the one or more dynamic parameters comprise: changing weather, changing environmental conditions, changing states of the agent and surrounding agents, changing states of the target and of other targets and total time left to execute the one or more actions; and outputting, by the one or more hardware processors, the determined one or more actions to at least one of: the agent and one or more user devices associated with the user for performing the one or more activities.

12. The method of claim 11, wherein the one or more input parameters comprise at least one or combination of: a relative state of the one or more targets with respect to the agent, a normalized weightage of a target priority, target observation mission stage of a selected target, a situational awareness of external agents surrounding the agent, a situational awareness of external targets surrounding the one or more targets, a spatial freedom of motion of the agent, a target size, a target type, an inertial state of the agent, one or more agent states that would impact performance, target selection history, gravity, weather, motion of the agent, rotation of the agent, physical location of the one or more targets, potential opportunity of the external agents to make observation, observation history of the one or more targets by the agent and the external collaborating agents, proximity of a target to angle of incidence, visibility and probability of downlink of data.

13. The method of claim 11, wherein the expected reward value is associated with set target priority, state of craft, observation quality and timing of performing the one or more activities.

14. The method of claim 11, further comprises executing the generated one or more actions by the agent to perform the one or more activities.

15. The method of claim 11, further comprises validating the generated expected reward value for each of the one or more targets and the determined desired target in a simulation environment based on one or more predefined simulation rules.

16. The method of claim 11, further comprises:
generating an actual reward value corresponding to the desired target upon executing the generated one or more actions by the agent by using the trained policy network based ANN model;
computing an error in the expected reward value corresponding to the desired target based on difference between the expected reward value and the actual reward value by using the trained value network based ANN model;
updating learning of the trained value network based ANN model based on the computed error by using reinforcement learning, wherein reinforcement learning is performed by using Stochastic Gradient Descent (SGD), wherein the trained value network based ANN model updates one or more value network parameters based on the computed error and wherein the learning of the trained value network based ANN model is updated for one or more training sessions until a desired expected reward value is achieved based on the computed error;
generating an updated expected reward value for each of the one or more targets by applying the received request and the one or more input parameters to the updated trained value network based ANN model; and
determining a different target among the one or more targets based on the updated expected reward value of each of the one or more targets by using the updated trained value network based ANN model, wherein the updated expected reward value associated with the different target corresponds to a higher updated expected reward value.

17. The method of claim 16, further comprises:
training the policy network based ANN model based on the received request, the received one or more input parameters, the desired target, the one or more dynamic parameters and the expected reward value to determine the one or more actions to be executed by the agent;
updating learning of the trained policy network based ANN model based on the determined different target and the updated expected reward value corresponding to the determined different target by using reinforcement learning, wherein the trained policy network based ANN model updates one or more policy network parameters based on the determined different target and the updated expected reward value corresponding to the determined different target, wherein the learning of the trained policy network based ANN model is updated for one or more training sessions until optimal one or more actions are determined based on the updated expected reward value; and
determining one or more actions to be executed by the agent corresponding to the determined different target based on the received request, the received one or more input parameters, the different target, one or more dynamic parameters and the updated expected reward value by using the updated policy network based ANN model.

18. The method of claim 17, further comprises initializing each of the one or more training sessions with one or more initial parameters, wherein the one or more training sessions comprise: concurrent execution of one or more simulation episodes from a start time to an end time, wherein the one or more initial parameters comprise: a random parameter, a specific parameter and a prior learning session parameter, wherein each of the one or more simulation episodes comprise a starting condition and wherein the starting condition comprises: initializing a dynamic state of the one or more agents, the one or more targets and the environment.

19. The method of claim 18, further comprises terminating each of the one or more simulation episodes upon reaching one or more predefined termination states in the simulation episode, wherein the one or more predefined termination states comprise: a loss of the agent, a loss of the one or more targets and completion of the one or more activities.

20. The method of claim 11, further comprises determining an action schedule corresponding to the one or more targets based on the received request, the received one or more input parameters and the one or more dynamic parameters by using the trained policy network based ANN model, wherein the action schedule comprises: a set of actions to be executed by the agent corresponding to each of the one or more targets and time of executing the set of actions by the agent corresponding to each of the one or more targets.

* * * * *